United States Patent [19]

Auge et al.

[11] 3,882,040

[45] May 6, 1975

[54] SILICON REMOVAL FROM INCINERATOR ASH BY REACTION WITH NOF.3HF

[75] Inventors: Robert G. Auge; Robert P. DeGrazio, both of Boulder, Colo.

[73] Assignee: The United States of America as represented by the United States Energy Research and Development Administration, Washington, D.C.

[22] Filed: June 21, 1973

[21] Appl. No.: 372,134

[52] U.S. Cl..... 252/301.1 W; 252/301.1 R; 423/20; 423/341; 423/343
[51] Int. Cl............................................ G21c 11/42
[58] Field of Search............ 252/301.1 R, 301.1 W; 423/20, 341, 343, 344, 386, 387

[56] References Cited
UNITED STATES PATENTS

| 1,380,458 | 6/1921 | Woodruff et al. | 423/343 X |
| 2,914,383 | 11/1959 | Ulrich | 423/343 |
| 3,062,902 | 11/1962 | Anello et al. | 423/386 |
| 3,185,541 | 5/1965 | Anello et al. | 423/386 |

FOREIGN PATENTS OR APPLICATIONS 2,034,055   12/1970   France

OTHER PUBLICATIONS

DeGrazio, R. P., Removal of Silica From Plutonium Processing Anion Exchange Resin by Caustic Wash, AEC Report No. RFP-1037.

*Primary Examiner*—Benjamin R. Padgett
*Assistant Examiner*—R. E. Schafer
*Attorney, Agent, or Firm*—Dean E. Carlson; Dudley W. King; Ignacio Resendez

[57] ABSTRACT

Incinerator ash containing silicon is contacted with nitrosyl fluoride trihydrogen fluoride (NOF.3HF) converting silicon present to silicon tetrafluoride ($SiF_4$) gas, thereby minimizing formation of gelatinous silica polymer in subsequent treatment of the ash to recover plutonium, americium, and the like.

5 Claims, No Drawings

SILICON REMOVAL FROM INCINERATOR ASH BY REACTION WITH NOF.3HF

BACKGROUND OF INVENTION

The invention relates to a method for separating silicon from incinerator ash.

Plutonium contaminated material, e.g., paper, plastic, wood, rags, ion exchange resins and other burnable material is generally incinerated and the plutonium thereafter removed or recovered from the resulting ash. Generally, the ash contains large amounts of silicon, primarily in the form of silica ($SiO_2$). The presently used process for recovering plutonium involves dissolution of the ash in a nitric-hydrofluoric acid solution. An inherent problem with this process is that some of the silicon is converted to fluosilicic acid ($H_2SiF_6$) and silicon tetrafluoride, which compounds hydrolyze and form an objectionable gelatinous, sticky silica polymer which coats components of the plutonium recovery system such as filters, piping, valves, pumps and ion exchange columns. This results in an increase in maintenance requirements, increase in shutdown time for maintenance, increased costs for recovery of the radioisotope, and other like problems.

SUMMARY OF INVENTION

In view of the above described limitations and drawbacks, it is an object of this invention to provide a method of removing a major portion of the silica prior to dissolution of the ash in nitric-hydrofluoric acid.

It is an object of this invention to reduce or eliminate silicon polymer formation in the process for removing plutonium from incinerator ash.

It is a further object of this invention to reduce the amount of down time and maintenance required in the plutonium recovery system for incinerator ash.

It is a further object of this invention to remove greater than about 75% of the silicon from the incinerator ash prior to plutonium recovery.

Various other objects and advantages will become apparent from the following description of this invention, and the most novel features will be pointed out with particularity hereinafter in connection with the appended claims. It is understood that various changes in the details, materials and process steps which are herein described and illustrated to better explain the nature of the invention may be made by those skilled in the art without departing from the scope of this invention. The present invention is not restricted to the recovery of plutonium since various other radioisotopic materials or actinides such as uranium, americium and cerium may be recovered subsequent to the process described herein.

The invention comprises, in brief, contacting incinerator ash containing a radioactive material such as plutonium with nitrosyl fluoride trihydrogen fluoride (NOF.3HF) to effect a reaction between same and volatilization and removal of greater than about 75 weight percent of the silicon present by conversion to silicon tetrafluoride gas.

DETAILED DESCRIPTION

Radioisotope contaminated materials such as paper, plastic, wood, rags, ion exchange resins and other burnable material may be incinerated to form incinerator ash which is thereafter contacted with NOF.3HF to react with the silicon present in the incinerator ash and convert it to silicon tetrafluoride gas in accordance with the following equation:

$$SiO_2 + NOF.3HF \longrightarrow SiF_4 + NO_2 + \text{various oxides of nitrogen}$$

The silicon tetrafluoride gas which forms may be removed through suitable means such as an exhaust blower. The radioisotope contaminant may be such as plutonium, americium, cerium, and uranium.

The NOF.3HF as discussed above is preferably in a from about 0.75 milliliter (ml) to about 1.0 ml proportion of NOF.3HF with a from about 3.2 ml to about 5.0 ml proportion of water per gram of incinerator ash. A preferred concentration is about 10 milliliters (ml) of NOF.3HF with about 50 ml of water which may be contacted with such as about 15 grams of ash.

The resultant mixture may be appropriately heated, such as on a hot plate or other heating apparatus, to from about 75°C to about 100°C and preferably to about 80°C and, with stirring, may be maintained at temperature for a period of from about 75 to about 100 minutes and preferably for about 90 minutes. The silicon tetrafluoride gas which was generated during this heating may be removed by suitable exhaust means such as an exhaust blower. If desired, the remaining ash may then be cooled, filtered and dried. Filtration may be accomplished through well known means such as by using No. 30 Whatman filter paper. Drying may be accomplished by heating the residue under a vacuum in an oven at a suitable temperature such as about 120°C for about 2 hours.

In an example illustrating the efficiency of this invention, 15 grams of ash (containing 1.935 grams of plutonium) were contacted with a mixture of 50 ml of water and 10 ml of NOF.3HF, heated to a temperature of about 80°C and maintained at that temperature for about 90 minutes, and thereafter the remaining ash was filtered and washed with water. The precipitate or ash was then dried in an appropriate manner by using a vacuum type oven. The weight of remaining ash after drying was 11.5 grams (containing 1.495 grams of plutonium) which was a weight reduction of 23.3%. There was a slight loss (0.44 grams) of plutonium from the ash between or during said reaction and processing due to some dissolution of plutonium and loss in the washing cycle. This plutonium was recovered in subsequent solution ion exchange recovery processes. In this example, the silicon content before contact with the NOF.3HF was greater than 10% and after contact was 2.3% thereby giving a minimum of 77% silicon removal from the incinerator ash as silicon tetrafluoride gas.

This invention has been accomplished by the use of NOF.3HF, which is a very strong oxidizing agent. The use of hydrogen fluoride per se did not work satisfactorily to convert silicon dioxide to silicon tetrafluoride.

Incinerator ash as used herein is generally of a particle size of from about .001 inch to about 0.5 inch diameter. As is well known in the art, when contacting a granular material with a liquid, maximum surface area presented for contact is desirable and, as such, the smaller size particles of incinerator ash for contact with the NOF.3HF would be preferred. Stirring or agitation of the solution may be accomplished by any well known means such as the use of a magnetic stirrer.

Further removal of silicon from incinerator ash may be accomplished by recycling the incinerator ash through subsequent stages of this process. The number of times that this process is repeated will be dependent upon the percent removal of silicon from incinerator ash desired. Further, the volume of water, or the like wash solution, used in washing the ash in the filtration step is preferably minimized in order to maintain as small as possible the amount of solution contacting radioactive material.

The following table illustrates other elements that may be present in the incinerator ash and the effect of using this invention. It is to be noted that there is a substantial reduction in the quantities of a large amount of these elements which facilitate subsequent extraction of the desired radioisotope from these materials. Analysis of the ash was made by optical emission spectroscopy. Specific radioisotopes which have been separated from incinerator ash after separation of the silicon have been such as plutonium-238, plutonium-239 and americium-241.

TABLE

| Elements | Analysis* of Incinerator Ash Before NOF.3HF Treatment | Analysis* of Incinerator Ash After NOF.3HF Treatment |
|---|---|---|
| Al | 1–10% | 1–5% |
| B | 500 | <**5 |
| Ba | 5000 | 1–5% |
| Be | 10 | 3 |
| Ca | >***10% | >10% |
| Co | 200 | <50 |
| Cu | 5000 | 1000–5000 |
| Fe | 1–5% | 1–5% |
| K | 1–5% | 1–5% |
| Mg | >10% | 1–10% |
| Mn | 0.5–1% | 100 |
| Mo | 200 | <50 |
| Ni | 1–5% | 1000–5000 |
| P | 1000 | <1000 |
| Pb | 0.5–1% | 1–10% |
| Si | >10% | 2.3% |
| Cr | 5000 | 1000–5000 |
| Sr | 3000 | 1000 |
| Ta | 2000 | 1000–5000 |
| Ti | 1–5% | 1000–5000 |
| W | 2000 | — |
| Zn | 1–5% | 1000 |

*expressed in parts per million or percent
**less than
***greater than

What is claimed is:

1. In the recovery of plutonium, americium, and the like, the method for removing silicon from ash containing silicon comprising contacting said ash with a solution containing from about .75 milliliters (ml) to about 1.0 ml of nitrosyl fluoride trihydrogen fluoride and from about 3.2 ml to about 5.0 ml of water for each gram of said ash, heating to from about 75°C to about 100°C, agitating while maintaining said temperature for from about 75 minutes to about 100 minutes to effect reaction of said nitrosyl fluoride trihydrogen fluoride with said silicon forming thereby silicon tetrafluoride gas, and removing said silicon tetrafluoride gas.

2. The method of claim 1 wherein said solution contains about 10 ml of nitrosyl fluoride trihydrogen fluoride and about 50 ml of water, said ash weighs about 15 grams, said heating is to about 80°C, and said temperature is maintained for about 90 minutes.

3. The method of claim 1 wherein about 77 weight percent of said silicon in said ash is converted to silicon tetrafluoride gas.

4. The method of claim 1 wherein said ash comprises radioisotope contaminated incinerator ash from materials selected from the group consisting of paper, plastic, wood, rags, ion exchange resins, and mixtures thereof.

5. The method of claim 4 wherein said radioisotope is taken from the group consisting of plutonium, americium, uranium and cerium.

* * * * *